C. OGBURN.
OVEN.
APPLICATION FILED MAR. 18, 1911.

1,035,036.

Patented Aug. 6, 1912.

WITNESSES:
Thos. W. Riley
M. Newcomb

INVENTOR
C. Ogburn
BY
W. J. FitzGerald
Attorneys

UNITED STATES PATENT OFFICE.

CALVIN OGBURN, OF LOS ANGELES, CALIFORNIA.

OVEN.

1,035,036.　　　Specification of Letters Patent.　　Patented Aug. 6, 1912.

Application filed March 18, 1911. Serial No. 615,288.

*To all whom it may concern:*

Be it known that I, CALVIN OGBURN, a citizen of the United States, residing at Los Angeles, in the county of Los Angeles and State of California, have invented certain new and useful Improvements in Ovens; and I do hereby declare the following to be a full, clear, and exact description of the invention, such as will enable others skilled in the art to which it appertains to make and use the same.

This invention relates to ovens and more particularly to that class of ovens known as portable ovens adapted to be heated by gas, gasolene, alcohol, kerosene, etc.

An object of the invention is to provide an oven of this nature adapted to be placed over a gas or gasolene burner, alcohol or kerosene lamp, or in fact any light from a smokeless fuel or it may be heated by electricity.

Another object is to provide an oven of the above stated character provided with a plurality of compartments for baking, cooking or warming purposes, within which compartments the heat may be controlled at the will of the operator.

Another object is to provide an oven having a flue extending vertically of one side of the compartments, but separated therefrom by a partition having passages therethrough, and dampers to control the air currents passing through said flue and from said flue into said compartments through the passages, and from one compartment to another.

A further object is to provide an oven of the above stated character having a heated air collecting and directing funnel adjustable laterally, said heated air collector, condenser and director being telescopically secured within the lower end of the flue, said oven being adapted to be placed so that the heated air collecting and directing funnel is adjustably secured over or around the blaze or the current of heated air emanating from the main source of the supply of heat, and, a still further object is to provide an oven of the above stated nature so constructed and provided with such dampers that the heated air passing to and from the various compartments of the oven, and from one compartment to another, may at all times, as well as the heated air within each compartment, be controlled and regulated at the will of the operator, thus saving heat and fuel.

Other objects and advantages will be hereinafter set forth and pointed out in the specification and claims.

Figure 1:
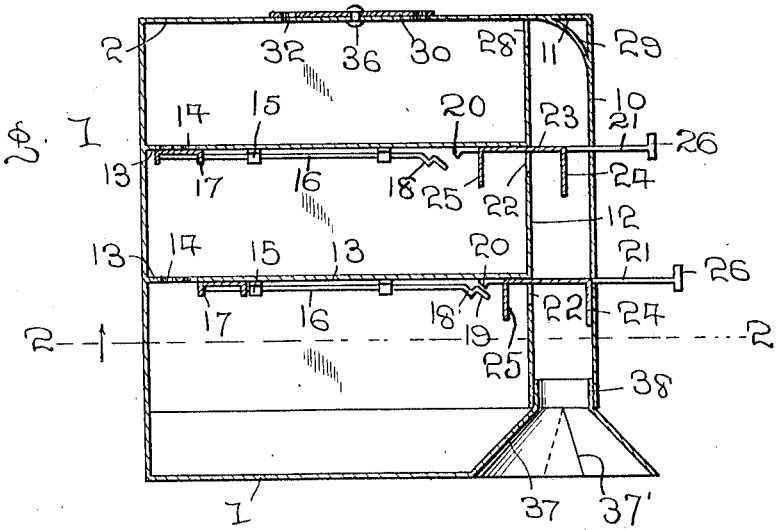
Figure 2:
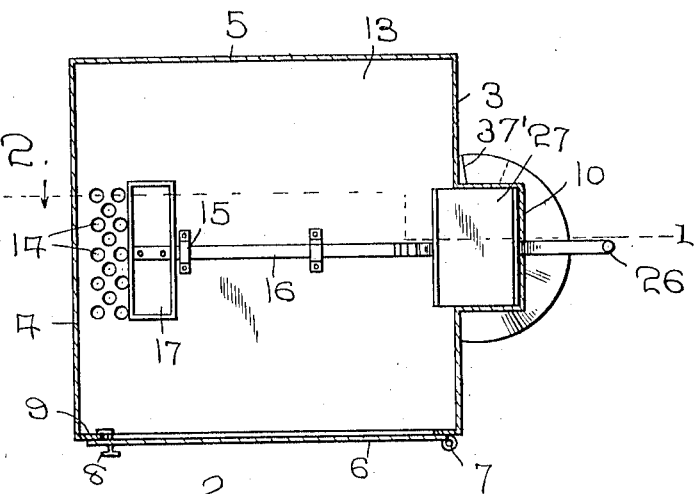
Figure 3:
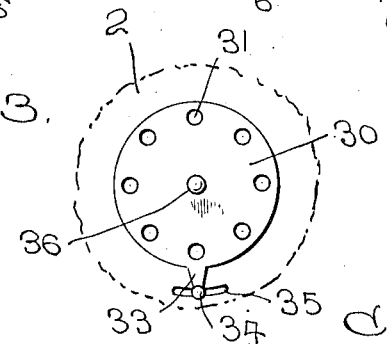

In the accompanying drawings which are made a part of this application, Figure 1 is a vertical sectional view on the line 1—1 of Fig. 2. Fig. 2 is a horizontal sectional view on the line 2—2 of Fig. 1, and, Fig. 3 is a fragmentary detail view, looking at the under side of the top of the oven and showing the rotary damper secured to the under side thereof.

Referring to the drawings in which similar reference numerals designate corresponding parts throughout the several views, 1 represents the bottom of the oven, 2 the top, 3 and 4 the sides and 5 the back. The entire front 6 swings open on the hinges 7 secured to one edge of the side 3 and is secured by means of a latch 8 in closed position, the latch 8 catching the projection 9 of the side 4. Thus, it will be seen that the front 6 serves as a door for the oven.

Formed integral with the wall 3 is the U-shaped casing 10 extending from the top of the oven to within a short distance of the bottom thereof. The top 2 extends over the inclosure 10, forming a top therefor, as shown at 11. It will be seen that the U-shaped inclosure 10 in connection with the portion 12 of the wall 3 (which portion 12 is directly opposite the wide portion of the inclosure 10) forms a rectangular flue exteriorly of the oven, the purpose of which will later appear.

The oven is provided with the horizontal partitions or shelves 13 spaced from one another, dividing the oven into compartments one above another. The partitions are provided near their edges opposite the flue, with perforations 14, which are adapted at times to be closed by dampers, which will be later described. Upon the under side of the partitions 13 are the brackets 15 adapted to slidably receive the damper bars 16 carrying the damper plates 17 upon one end and having their opposite ends bent, as shown, to form the V-shaped recesses 18 and the spring guide portions 19 to be engaged by the enlarged ends 20 of the main damper rods 21. The rods 21 extend through openings within the outer wall of the inclosure 10 and through the portion 12 of the wall 3 directly below each partition 13, the enlarged ends 20 of said rods pressing against the spring ends 19 of the bars 16 and forcing their way into the recesses 18 to operate the bars 16. The openings 22 within the partition portion 12 of the wall 3 of the rectangularly shaped flue 10 extend downwardly a short distance and are equal in width to the width of the flue 10, front to back. Carried by each rod 21 is an inverted U-shaped damper 23, the long downwardly extending prong 24 of which rests within the flue 10, while the shorter prong 25 is positioned within one of the compartments of the oven. The prong 25 while being shorter than the prong 24 is longer than the depth of the opening 22, the purpose of which will later appear.

When a rod 21 is operated by means of its handle 26 to draw the rod 21 to its outer position, the prong 25 will be drawn near the inner side of the partition portion 12 of the wall 3, while the prong 24 will be drawn against the inner side of the opposite wall of the flue 10, the straight or horizontal portion 27 of the damper closing the flue 10, preventing either upward or downward passage of the heated air within said flue. This movement of the rod 21 will cause its enlarged inner end 20 to be drawn out of the V-shaped recess 18 within the bar 16, after the latter has been drawn to the limit of its movement in this direction, on account of the plate 17 engaging against the adjacent bracket 15. When the bar 16 and plate 17 are in this position the heated air may circulate between the adjacent compartments through the openings 14 from below which openings the plate 17 has been drawn. By shoving the rod 21 inwardly about half its movement the prongs 24 and 25 will be at equal distances from the opposite faces of the partition portion 12 of the wall 3 and will allow the free passage of the heated air from the flue 10 into the compartment through the opening 22. This will also allow the heated air to pass upwardly through the flue 10 between the prong 24 and the outer wall of the flue 10. By pressing the rod 21 inwardly to its fullest extent, the prong 24 will be pressed against the outer surface of the partition 12 and will thereby close the opening 22. The heated air passing through the flue 10 will then not be obstructed at all by the damper 23. In shoving the rod inwardly to its full extent the enlarged end 20 will force its way into the V-shaped recess 18 of the bar 16, thus automatically coupling the two together.

At the upper end of the partition portion 12 of the wall 3 is an opening 28 connecting the upper compartment with the flue 10. At the upper end of the flue 10 is the curved heated air guide 29, which guides the heated air toward the opening 28, as said heated air rises to the upper end of the flue 10.

Secured to the flat top 2 of the oven is the circular plate or disk 30, which may be secured upon the upper side of said top, but is preferably secured to the under side, as shown in Fig. 3.

The disk is provided with a plurality of circularly arranged openings 31 near its edge, which are adapted to communicate with the openings 32 in the top 2 to control the exit of the products of combustion from the oven. When the disk 30 is secured upon the under side of the top, it is provided with the offset portion 33 having the extremity 34 thereof turned at a right angle and projected through the guide slot 35 in the top of the oven. By means of this extremity 34 the disk may be rotated to regulate the size of the openings and thereby the escape of the products of combustion. As will be understood the disk may be secured for rotation by a rivet 36 or other suitable means. The bottom 1 is inclined and bent in substantially circular form adjacent the flue 10, to form the inverted funnel portion 37, and is split from the bottom edge to within a short distance of the upper edge as at 37', to allow spreading of the lower inverted funnel shaped portion 37. The upper extremity of this portion is turned in a vertical direction, as shown at 38, to fit within the lower end of the rectangular flue 10. By means of this construction the inverted funnel portion serves as a heated air collector and director, and is adapted to be adjusted above and around the blaze or other source of heat and collect the heated air emanating therefrom and direct it into the flue 10, from which it may be distributed into and through the various compartments, as previously described. In each instance where the short prong 25 is away from the inner side of the partition 12, said prong acts as a heated air deflector and distributer to direct the heated air downwardly as it enters the chamber.

It will be readily understood that if desired only the lower compartment may be used. In this case the upper and lower rods 21 are pulled outward to their fullest extent to draw the prongs 24 against the outer wall of the flue 10 and thus close said flue.

The prongs 25 are now a short distance inwardly of the openings 22 and will allow the heated air to travel into said lower compartment from the flue 10. In this case the plates 17 should be drawn away from the openings 14 to open the latter for the escape of the heated air.

If it is desired to use the lower and second compartments, the upper rod 21 is pulled out, while the lower rod is shoved in a short distance and the upper and lower plates 17 drawn back from the openings 14, thus allowing the heated air to pass from the lower chamber through the lower openings 14 and through the upper openings 14 in the next chamber to the top chamber directly above, and thence to the atmosphere through the opening 32 in the top of the oven. If it is desired to use only the upper compartment or to use the top for broiling, boiling or other purposes, both rods 21 are pushed inwardly, closing the passages 22 by the prongs 24, thus forcing all of the heated air to travel the full length of the flue 10 and into the upper compartment, through the opening 28. The guide 29 assists in directing the heated air into said upper compartment. As will be understood, the disk 30 may be rotated upon the rivet 36 to open or close the exit openings in the top of the oven as desired. To use all three compartments at one time both of the rods 21 are first shoved inwardly to automatically couple with the bars 16, as previously described, and then said rods 21 are drawn outwardly about half way, the prongs 24 resting about midway between the long sides of the flue 10. This operation also serves to draw the plates 17 from against the openings 14. Thus, it will be seen that the heated air may enter the compartments through the openings 22 and 28 and from there it escapes through the openings 14 in the partitions 13 and out through the holes 32 in the top of the oven. All of the compartments being heated, various cooking operations may be carried on within the different compartments, all of which are in this case being heated by the same amount of fuel required to heat one ordinary compartment. To heat the second or middle compartment only, the lower rod 21 is shoved all the way in, while the upper rod 21 is pulled out. This shuts off the lower compartment and also closes the flue from the second damper to the top of the flue. Thus, it will be seen, that all of the heated air entering the condenser and the flue 10 is compelled to travel upwardly within the flue until it reaches the opening in the second partition 12 opposite the second compartment and travels through this passage into the compartment, heating the latter. It will be understood that the upper of the plates 17 is drawn away from the openings 14 and the latter are thereby opened to allow the heated air to escape therethrough. When it is desired to use the second and the upper compartments at the same time, the lower rod 21 is shoved clear in but the upper rod 21 is, in this instance, only shoved half way in, allowing part of the heated air traveling upwardly within the flue 10, to enter the central compartment and the remainder of the heated air to travel past the upper damper to the upper compartment. In this instance the upper plate 17 may be drawn away from the openings 14 in the upper horizontal partition or shelf between the upper and central compartments. Thus, the heated air will be allowed to travel from the central compartment to the upper compartment and thence to the atmosphere through the openings 32 in the top of the oven.

It will be readily apparent that the above described oven may be operated at an extremely low cost and that the heat collector may be positioned around or over any blaze to collect the heated air therefrom and distribute it to the various compartments. It will also be apparent that the heating of each and every compartment will at all times be under the control of the operator, who may vary the heated air within any compartment by simply manipulating the damper controllers and the disk at the top of the oven without opening the oven door or in any way causing the admittance of cool air within the oven.

What I claim is:

1. An oven comprising a casing having partitions therein to divide said casing into compartments, said partitions being provided with passages therethrough connecting said compartments, means for closing said passages, means for collecting heated air and conveying the same to said compartments, means for controlling the passage of said heated air to said compartments from said heated air collecting means and for spreading said heated air within said compartments as it enters the latter, and means for controlling the passage of heated air from said oven.

2. An oven comprising a casing having horizontal partitions dividing said oven into a plurality of compartments, said partitions having openings therethrough, means carried by said partitions to close said openings to cut off one compartment from another, a heated air collector for said oven, a heated air conducting flue extending vertically of said oven and partitioned therefrom by one of the walls of the latter, said heated air collector being adapted to direct the collected heated air into said flue, said casing being provided with passages therethrough to allow the heated air to pass from said flue to said compartments, rods extending into said flue, said rods projecting into certain of said compartments, said rods carrying means for controlling the passage of heated air from said flue to said compartments, and means for coupling with the means carried by said horizontal partitions to operate said partition opening closing means.

In testimony whereof I have signed my name to this specification in the presence of two subscribing witnesses.

CALVIN OGBURN.

Witnesses:
CHARLES A. SCOTT,
HARRY B. MORTON.

Copies of this patent may be obtained for five cents each, by addressing the "Commissioner of Patents, Washington, D. C."